Feb. 4, 1941.                    D. F. SEARLE                    2,230,701
                          VACUUM BRAKE CONTROL VALVE
                            Filed March 23, 1940
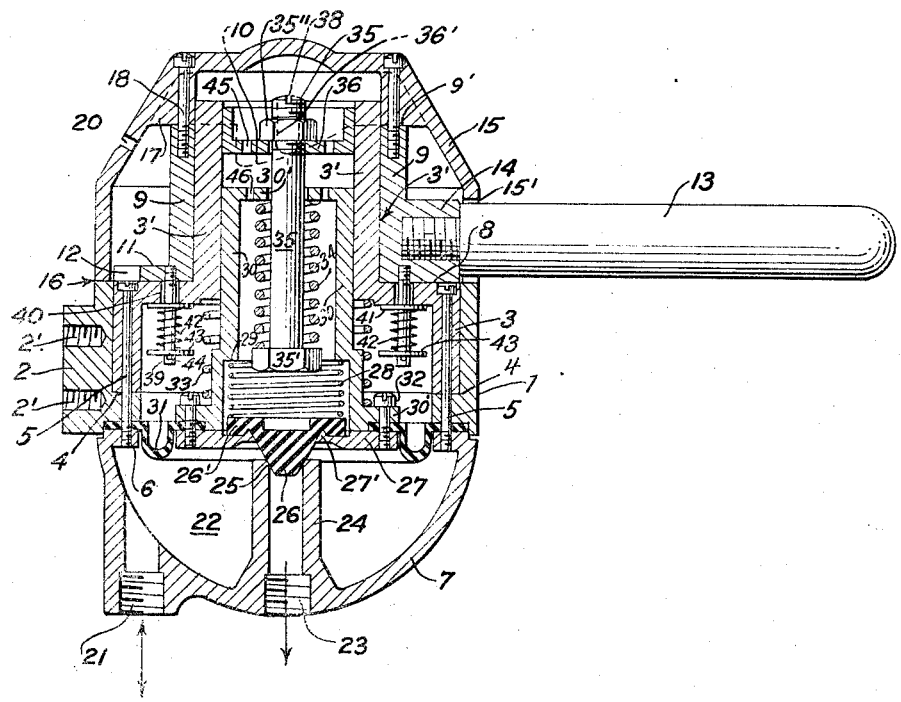
INVENTOR.
DUDLEY F. SEARLE
BY
ATTORNEY.

Patented Feb. 4, 1941

2,230,701

UNITED STATES PATENT OFFICE 2,230,701

VACUUM BRAKE CONTROL VALVE

Dudley F. Searle, Oakland, Calif.

Application March 23, 1940, Serial No. 325,646

6 Claims. (Cl. 303—54)

This invention relates to vacuum brakes for vehicle wheels, particularly automobile brakes operated by vacuum from the engine intake manifold, and the principal object of the invention is to provide improved construction in a valve to control the application and release of such vacuum brakes, whether the brakes are located on the vehicle being driven, or on a trailer hauled by the vehicle and controlled from the leading vehicle.

Particular objects of the improved construction are compactness, reliability of operation, and accessibility of parts.

Other advantages of the construction will appear in the following description and accompanying drawing.

In the drawing:

Fig. 1 is a vertical sectional view of my vacuum brake control valve showing all of its working parts.

Fig. 2 is a perspective view of the valve with the upper cap removed so as to show the rim cam which raises or lowers the compression spring belt.

Generally stated the control valve is of the well known type as used either for air brakes or other air operated machinery either from a positive or negative pressure, and its object is to control the amount or degrees of pressure in a brake cylinder or other work cylinder whether of the piston displacement or diaphragm type, in a manner to correspond with the movements of a manually, pedally, or otherwise operated handle or lever, and to stop, and reverse, the application of pressure at all times in conformity with the movement of the operating lever. This general mode of operation of such, so called "remote control" valves being old and well known in the art my invention has to do with the specific construction and arrangement of parts as will now be described.

In the drawing 1 is the central or main body portion of the valve and it is provided with any desired form of attachment lugs or flanges, one in the illustration being designated 2 and fitted with tapped holes 2' or otherwise formed and adapted for securing in fixed position to the dash or frame of the vehicle within easy reach of the vehicle driver.

This body portion 1 is of annular form and non-revolvably mounted within it is a circular hollow inverted cup-like member 3 which seats at its lower edge on an inwardly projecting shoulder formed in the body 1 and is secured thereto by screws 5 which pass entirely through the shoulder and screw into an inwardly extending flange 6 formed around the upper edge of a lower cap member 7. Since outer body 1 and inner member 3 are bolted in fixed relation the latter may be considered as an inner body, as it is made separable merely for assembling purposes.

Inverted cup-member 3 or inner body is reduced in diameter at 3' to form a flat shelf 8 upon which is revolvably supported a circular rim-cam member 9 formed with cut-away portions at opposite points in its upper edge to provide two slanted cam surfaces 10, while the lower end of the cam member is formed with an outwardly extending flange 11 resting on shoulder 8 and which flange is provided with suitable holes or notches as at 12 to afford accessibility to the heads of screws 5 to permit their insertion and removal.

As a means of operating the cam a handle 13 is shown screwed into a boss 14 formed on the cam member and projects outwardly for grasping by the vehicle driver, but any desired hand or foot operated lever may be used, depending on the particular installation requirements.

Covering the upper end of the valve is an upper cap 15 which is slotted as at 15' to fit over the handle, and seats at its lower edge against the upper edge of the body member 1 as indicated at 16, and is provided with two internal lugs or bosses 17 which seat against the upper flat edge 9' of the cam member and are secured thereto by screws 18 which screw into threaded holes 19, and whereby the upper cap 15 and the cam turn together as a unit when the handle is turned. This cap may have one or more air inlet vents as indicated at 20 though it should be noted that the clearance at the handle slot 15' is generally sufficient vent for this purpose.

The lower cap 7 is provided with two threaded openings for the connection of pipes, one 21 which leads to the chamber 22 within the lower cap is to receive a pipe leading from a vacuum brake actuating chamber or a vacuum relay valve (not shown) for exhausting the same, while the other opening 23 is for attachment of a pipe leading to the vehicle engine exhaust manifold or other source of vacuum (not shown) and the opening 23 terminates within chamber 22 in a vertical tube 24 formed with a tapered valve seat 25 at its upper end which is controlled by a soft rubber conical valve 26.

Conical rubber valve 26 is outwardly flanged at its upper end as at 26' and is suspended from its flange from a relatively flat valve plate 27 with the conical portion of the rubber valve projecting downwardly through a circular opening in the plate and which opening is surrounded by an upwardly extending rim 27' which forms a valve seat normally closed by contact with the flange 26' of the rubber valve.

The rubber valve 26 is normally gently urged downward by a light compression spring 28 which reacts between the upper side of the valve flange 26' and a shoulder 29 formed within a hollow bell-shaped member 30 which is slidably positioned within fixed member 3'. Bell-shaped member 30 is outwardly flanged at its lower end as at 30' where it overlies the inner margin of a soft rubber diaphragm ring 31 which is in turn overlapped at its under side by the outer margin of plate 27 and the three members are clamped together by screws 32, while the outer margin of the diaphragm is clamped between the lower edge of the body 1 and the upper flange 6 of lower cap 7 by screws 5. The diaphragm ring 31 is of deep U section to gain flexibility.

The inner assemblage constituted of the diaphragm 31, valve plate 27 and bell-shaped member 30 is normally urged downward by a compression spring 33 surrounding the bell-shaped member and reacting between its flange 30' and the reduced diameter portion 3' of fixed inverted cup-member 3, but is subject to being lifted against the force of spring 33 (or lowered below the position shown in the drawing) by means of the cam 10 when turning the handle 13, and to effect which bell-shaped member 30 is resiliently suspended on a coiled compression spring 34 positioned inside and bearing at its upper end against the upper wall 30' of the bell, and through which spring extends a bolt 35 with its head 35' engaging the lower end of the spring, and which bolt projects freely through an opening in the head of the bell as shown and also through a yoke member 36 which fits slidably within member 3' and has two arms 36' which project radially therefrom through slots 37 formed in member 3', and engage respectively over the slanted cam walls 10 of the cam member 9.

Bolt 35 is provided with a nut 35" at its upper end suspending it from the yoke member 36 and the upper end of the bolt is slotted as shown at 38 for holding it against turning relative to the nut when adjusting the latter to get the desired compression in spring 34.

As the yoke arms 36' bearing resiliently against the angular cam surfaces tend slightly to cause the cam member to turn I provide additional friction means to counteract this, and which takes the form of a couple of downwardly projecting studs 39 screwed at their upper ends into the cam member 9 and projecting through arcuate slots 40 in shelf 8 of member 3 and each stud provided with a washer 41 resiliently forced upward against the under side of shelf 8 by a spring 42 carried on the stud and reacting against an outer washer 43 held in place by a pin 44. Manifestly, in place of the outer washer and pin the stud could have a head.

Vent holes are provided in the yoke as at 45 and in the head of the bell-shaped member as at 46, though the latter could be dispensed with if the clearance for the bolt 35 is liberal.

In operation, with the conical soft rubber valve seated at 25 and closing the vacuum source passage 23, and also seated by its flange against the valve opening rim 27' in plate 27, it follows that whatever rarefication exists in chamber 22 also exists in the brake operating chamber and the brakes will be held in applied condition corresponding to such pressure. If now it is desired to apply the brakes with greater pressure, handle 13 is moved in direction of the arrow of Fig. 2 to thereby lift bolt 35 and put greater tension on spring 34 so as to lift bell-shaped member 30 and with it valve plate 27 and valve 26 to lift valve 26 slightly from seat 25 and thus expose chamber 22 (and the brake operating line connected to port 21) to increased suction from the engine. This increased suction however, by acting against the underside of the diaphragm assembly soon overcomes the increased tension put on the spring by the cam and draws the assemblage down again to close the valve 26 to the position shown in Fig. 1 to hold the brakes at the increased pressure, and so on for any desired pressure.

To release the brakes, or rather reduce the vacuum in chamber 22, a reverse movement of handle 13 will slack off on spring 34 and lower bell-member 30 together with valve plate 27 from the action of spring 33 until its valve seat rim 27' backs away from valve flange 26' and thus opens a path for air to enter chamber 22 around and under the edge of flange 26' from the vented space within the bell. If this "cracking" of the valve at 27' is slight, as soon as a small amount of air has entered the increased pressure in chamber 22 will overbalance springs 33 and lift the diaphragm assemblage to close valve 27' again to the position shown in Fig. 1 and hold it, but if the handle 13 be pulled all the way it will open the chamber 22 to atmospheric pressure, and with valve 26 of course remaining closed against the source of vacuum.

Regarding my combination disk and conical valve 26, 26', while I prefer to make this of soft rubber, it is manifest that other soft materials may be used and are intended to be included in the term rubber as used herein. This also applies to the diaphragm ring 31.

Having thus described my improved construction in an air control valve of the kind described, what I claim is:

1. In a vacuum brake controlling valve of the character described including a flexible diaphragm carrying a plate with valve opening and a valve for seating thereover, means for resiliently raising and lowering said plate comprising a tubular member secured at its lower end to said plate, a bolt with its head end within said member and opposite end freely extending through the upper end of said member, a compression spring around the bolt, supported on the head of the bolt resiliently suspending said member, a nut on the projecting end of the bolt for adjusting the tension of the spring, and means for raising and lowering said bolt.

2. In a vacuum brake controlling valve of the character described including a diaphragm carrying a plate with valve opening and a valve for seating thereover, means for resiliently raising and lowering said plate comprising a tubular member secured at its lower end to said plate, a bolt within said member and extending freely through the upper end of the member, a coiled compression spring around the bolt and suspended by its lower end thereon and its upper end supporting said member, a nut on the upper end of the bolt, a yoke supporting the nut and provided with a laterally extending lug, a circular cam engaging the lug of the yoke, and means for manually turning the cam to raise and lower the bolt.

3. In a vacuum brake controlling valve of the character described including a diaphragm carrying a plate with valve opening and a valve for seating thereover, means for resiliently raising and lowering said plate comprising a tubular member secured at one end to said plate, a bolt within said member, a compression spring around the bolt, a yoke supporting the upper end of the bolt, a circular cam engaging the yoke, and means for manually turning the cam to raise and lower the bolt, and means for frictionally holding the cam at any point of adjustment.

4. In a vacuum brake controlling valve, a hollow body provided with a cap secured to one end of the body forming a chamber provided with a passage for connecting a brake operating line and a second passage for connecting to a source of vacuum and provided with a vacuum valve seat, a flexible diaphragm assemblage separating said chamber from said body including a plate secured to the diaphragm provided with an opening forming a venting valve seat for venting said chamber to atmosphere aligned over said vacuum valve seat, a soft rubber conical valve projecting through said opening in position to close said vacuum valve seat and provided with a laterally extending flexible flange at the base of the cone overlying and normally closing said opening, spring means normally urging the conical rubber valve portion in a direction through said opening to seat against the vacuum valve seat and its flange against the venting valve seat, and means for resiliently progressively freeing either portion of the rubber valve from seating position while leaving the other portion seated comprising an inverted bell-shaped member secured at its large end to said plate and formed with an internal shoulder against which the spring means urging the rubber valve toward seating position reacts, a hollow cam member surrounding said bell-shaped member, a yoke positioned for raising and lowering by operation of the cam member, and means resiliently connecting the yoke with said bell-shaped member.

5. In a vacuum brake controlling valve, a hollow body provided with a cap secured to one end of the body forming a chamber provided with a passage for connecting a brake operating line and a second passage for connecting to a source of vacuum and provided with a vacuum valve seat, a flexible diaphragm assemblage separating said chamber from said body including a plate secured to the diaphragm provided with an opening forming a venting valve seat for venting said chamber to atmosphere aligned over said vacuum valve seat, a soft rubber conical valve projecting through said opening in position to close said vacuum valve seat and provided with a laterally extending flexible flange at the base of the cone overlying and normally closing said opening, spring means normally urging the conical rubber valve portion in a direction through said opening to seat against the vacuum valve seat and its flange against the venting valve seat, and means for resiliently progressively freeing either portion of the rubber valve from seating position while leaving the other portion seated comprising an inverted bell-shaped member secured at its large end to said plate and formed with an internal shoulder against which the spring means urging the rubber valve toward seating position reacts, a hollow cam member surrounding said bell-shaped member, a yoke positioned for raising and lowering by operation of the cam member, and means resiliently connecting the yoke with said bell-shaped member, an upper cap covering the yoke and adjacent parts, and an operating handle extending from the cam member beyond said cap.

6. In a vacuum brake controlling valve, a hollow body provided with a cap secured to one end of the body forming a chamber provided with a passage for connecting a brake operating line and a second passage for connecting to a source of vacuum and provided with a vacuum valve seat, a flexible diaphragm assemblage separating said chamber from said body including a plate secured to the diaphragm provided with an opening forming a venting valve seat for venting said chamber to atmosphere aligned over said vacuum valve seat, a soft rubber conical valve projecting through said opening in position to close said vacuum valve seat and provided with a laterally extending flexible flange at the base of the cone overlying and normally closing said opening, spring means normally urging the conical rubber valve portion in a direction through said opening to seat against the vacuum valve seat anad its flange against the venting valve seat, and means for resiliently progressively freeing either portion of the rubber valve from seating position while leaving the other portion seated comprising an inverted bell-shaped member secured at its large end to said plate and formed with an internal shoulder against which the spring means urging the rubber valve toward seating position reacts, a hollow cam member surrounding said bell-shaped member, a yoke positioned for raising and lowering by operation of the cam member, and means resiliently connecting the yoke with said bell-shaped member, an upper cap covering the yoke and adjacent parts, and an operating handle extending from the cam member beyond said cap, the upper side of said valve being vented to atmosphere through said bell-shaped member and upper cap.

DUDLEY F. SEARLE.